United States Patent Office 3,138,608
Patented June 23, 1964

3,138,608
SPIRO-OXAZOLIDINEDIONE DERIVATIVES
Martin A. Davis, Montreal, Quebec, Canada, assignor to American Home Products Corporation, New York, N.Y., a corporation of Delaware
No Drawing. Filed June 21, 1962, Ser. No. 204,051
3 Claims. (Cl. 260—307)

This invention relates to certain new chemical compounds and to their preparation.

More particularly, this invention relates to new chemical compounds having a spiro ring system formed from the linkage of an oxazolidinedione with a dibenzo [a,d]-[1,4]cycloheptadiene ring.

The new compounds, prepared as finel products in accordance with my invention, may be represented by the structural formula:

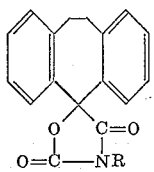

wherein R represents hydrogen or a lower alkyl group such as a methyl group.

My invention also relates to novel intermediate chemical compounds having a spiro ring system which are formed as intermediates, in the process by which compounds of the above structure are prepared from readily available starting materials.

The new chemical compounds formed by the linkage of an oxazolidinedione with a dibenzo[a,d][1,4]cycloheptadiene ring are characterized by possessing pharmacological properties. Thus the compound spiro{dibenzo-[a,d][1,4]cycloheptadiene - 5,5' - oxazolidine} - 2,4 - dione (where R in the generic formula represents hydrogen) possesses anticonvulsant activity. When administered to experimental animals it is capable of protecting them from electroshock seizures, and it also has some ability to protect them from the convulsive effects of pentylenetetrazole. The compound is useful as an anticonvulsant in the treatment and prevention of convulsive disorders. It may be administered orally in dosage forms such as dry powder capsules, or it may be formulated in compressed tablets together with pharmaceutically acceptable carriers such as, for example, lactose, starch, magnesium stearate, and the like. Alternatively, it may be administered by injection in the form of finely divided aqueous suspensions containing pharmaceutically acceptable dispersing agents such as, for example, polyoxyethylene, sorbitan oleates, certain vegetable gums, and the like. The unit dosage forms may be formulated to contain from 5 to 500 mg. of the active agent.

The novel compounds disclosed herein may be prepared by the condensation of an ester of 5-hydroxydibenzo[a,d][1,4]cycloheptadiene-5-carboxylic acid with urea in the presence of an alkaline reagent while operating in an appropriate solvent. It has been found convenient to use sodium dissolved in ethanol as the condensing agent. Similar conditions have been described by R. W. Stoughton in J. Amer. Chem. Soc., 63, 2376 (1941); U.S. 2,372,-861 (1945); for the preparation of similar compounds.

The methyl ester may be secured by the action of an ethereal solution of diazomethane on 5-hydroxydibenzo-[a,d][1,4]cycloheptadiene-5-carboxylic acid. This acid is itself prepared by the addition of potassium metal to dibenzo[a,d][1,4]cycloheptadiene dissolved in liquid ammonia with subsequent carbonation. Similar conditions have been described by P. J. Hamrick and C. R. Hauser in J. Amer. Chem. Soc., 81, 493 (1959) for the preparation of benzilic acid from benzophenone.

The sequence of chemical reactions is outlined below:

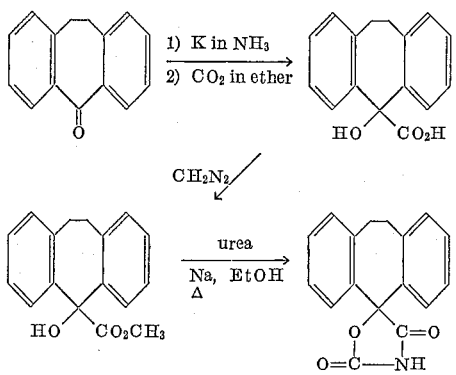

The spiro-oxazolidinedione of the above formula (i.e. where R is hydrogen in the generic formula) may be readily converted to the corresponding N-methyl derivative by treatment with an ethereal solution of diazomethane.

The following examples will serve to illustrate my invention:

EXAMPLE 1

5-Hydroxydibenzo[a,d][1,4]Cycloheptadiene-5-Carboxylic Acid

Potassium metal (3.9 g., 0.10 mole) was added to liquid ammonia (120 ml.) and shortly thereafter a solution of dibenzo[a,d][1,4]cycloheptadiene-5-one (10.4 g., 0.05 mole) in dry ether (50 ml.) was added dropwise. The ammonia was allowed to evaporate by the application of gentle heating and the volume was maintained by the occasional addition of fresh ether. A large excess of finely divided Dry Ice was added carefully and the mixture was stirred overnight, during which time all of the blue color has disappeared and was replaced by a creamy white suspension. It was carefully poured onto cold water and the ether layer combined with the ethereal extracts of the aqueous layer. Chilling and careful acidification of the aqueous layer gave a precipitate of the hydroxy acid which on combination with the material obtained from the chloroform and ether extracts of the aqueous layer amounted to 6.2 g. (48% yield) and which melted with decomposition over a range of 140 to 220° C. Recrystallization of a portion from chloroform-hexane gave a sample darkening at 160° C. and finally decomposed at 230° C.

Analysis confirmed the empiric formula $C_{16}H_{14}O_3$. Required: C, 75.57; H, 5.55%. Found: C, 74.99; H, 5.46%.

EXAMPLE 2

Methyl 5-Hydroxydibenzo[a,d][1,4]Cycloheptadiene-5-Carboxylate

An ethereal solution of diazomethane derived from N-nitrosomethylurea (20.6 g., 0.2 mole) was added to a chilled solution of the crude hydroxy acid prepared as described in Example 1 (16 g., 0.06 mole) in ether (100 ml.) until a permanent yellow color persisted. The excess of diazomethane was destroyed by the cautious addition of acetic acid in ether, the solution washed with dilute sodium bicarbonate solution and then dried. Evaporation and one recrystallization of the residue from carbon tetrachloride-hexane (charcoal) gave 10.2 g. (65% yield) of the title compound, M.P. 137–139° C. An analytical sample (from isopropanol) had M.P. 139–140° C.

Analysis confirmed the empiric formula $C_{17}H_{16}O_3$. Required: C, 76.10; H, 6.01%. Found: C, 76.06; H, 6.31%.

EXAMPLE 3

*Spiro{Dibenzo[a,d][1,4]Cycloheptadiene-5,5'-Oxazolidine}-2,4-Dione*

To a solution of sodium (0.65 g., 0.028 mole) in anhydrous ethanol (25 ml.) was added methyl 5-hydroxydibenzo[a,d][1,4]cycloheptadiene-5-carboxylate (7.5 g., 0.028 mole) and dry urea (1.7 g., 0.028 mole). The mixture was stirred and heated under reflux for 16 hours, ammonia being steadily evolved. The solution was concentrated in vacuo, i.e. at a pressure below atmospheric pressure, cooled and diluted with cold water (100 ml.). A little sodium hydroxide was added and the mixture was extracted with ether. The aqueous layer was acidified with cooling and the liberated product was taken up in ether. Washing the ether with water followed by drying of the organic layer and evaporation gave tan-colored crystals, M.P. 185–189° C. (dec.) (5.9 g., 80% yield). The title product was obtained as prisms from isopropanol-hexane, M.P. 194–196° C. (dec.), decomposition of the crystals from the solution being complete only after 2 to 3 days.

Analysis confirmed the empiric formula $C_{17}H_{13}NO_3$. Required: C, 73.11; H, 4.69; N, 5.02%. Found: C, 72.85; H, 4.87; N, 5.01%.

EXAMPLE 4

*Spiro{Dibenzo[a,d][1,4]Cycloheptadiene-5,5'-Oxazolidine}-3-Methyl-2,4-Dione*

A solution of the oxazolidinedione prepared as described in Example 3 (2.7 g., 0.01 mole) in ether (65 ml.) was treated at 5° C. with an ethereal solution of diazomethane derived from N-nitrosomethylurea (3.0 g., 0.03 mole) until a permanent yellow color remained. The solution was kept for an additional ½ hour, and was then evaporated in vacuo. Recrystallization of the residue from carbon tetrachloride-hexane afforded 2.5 g. (89% yield) of the title compound, M.P. 152–153° C.

Analysis confirmed the empiric formula $C_{18}H_{15}NO_3$. Required: C, 73.70; H, 5.15; N, 4.78%. Found: C, 73.96; H, 5.30; N, 4.63, 4.73%.

I claim:

1. A compound of the formula

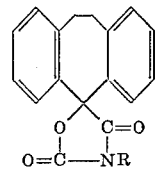

wherein R is selected from the group consisting of hydrogen and lower alkyl.

2. Spiro{dibenzo[a,d][1,4]cycloheptadiene-5,5'-oxazolidine}-2,4-dione.

3. Spiro{dibenzo[a,d][1,4]cycloheptadiene-5,5'-oxazolidine}-3-methyl-2,4-dione.

References Cited in the file of this patent

UNITED STATES PATENTS

| | | |
|---|---|---|
| 2,815,348 | Runge | Dec. 3, 1957 |
| 2,826,587 | Trask et al. | Mar. 11, 1958 |
| 3,002,992 | Wood | Oct. 3, 1961 |
| 3,061,638 | Hawthorne et al. | Oct. 30, 1962 |

OTHER REFERENCES

Winthrop et al.: J. Org. Chem., vol 27, pp. 230–41 (1962).